(12) United States Patent
Sun et al.

(10) Patent No.: US 8,344,054 B2
(45) Date of Patent: Jan. 1, 2013

(54) POLYMER NANOCOMPOSITES INCLUDING DISPERSED NANOPARTICLES AND INORGANIC NANOPLATELETS

(75) Inventors: Dazhi Sun, College Station, TX (US); Hung-Jue Sue, College Station, TX (US); Luyi Sun, College Station, TX (US); Nobuo Miyatake, Houston, TX (US); Katsumi Yamaguchi, Hyogo (JP)

(73) Assignee: The Texas A & M University System, College Station, TX (US)

( * ) Notice: Subject to any disclaimer, the term of this patent is extended or adjusted under 35 U.S.C. 154(b) by 657 days.

(21) Appl. No.: 11/880,820

(22) Filed: Jul. 24, 2007

(65) Prior Publication Data

US 2009/0029167 A1 Jan. 29, 2009

(51) Int. Cl.
*C08K 3/32* (2006.01)
*C08K 3/22* (2006.01)

(52) U.S. Cl. ......... 524/413; 524/417; 524/432; 524/440
(58) Field of Classification Search .................. 523/200; 524/432, 445, 413, 417, 440
See application file for complete search history.

(56) References Cited

U.S. PATENT DOCUMENTS

| | | | |
|---|---|---|---|
| 4,053,577 A | 10/1977 | Arkless | |
| 4,575,522 A * | 3/1986 | Breach et al. | 523/220 |
| 4,687,643 A | 8/1987 | Cortesi et al. | |
| 4,721,610 A | 1/1988 | Yoshida et al. | |
| 4,764,357 A | 8/1988 | Sherff et al. | |
| 4,778,671 A | 10/1988 | Wusirika | |
| 4,842,832 A | 6/1989 | Inoue et al. | |
| 4,871,790 A | 10/1989 | Lamanna et al. | |
| 4,925,704 A | 5/1990 | Sato et al. | |
| 4,927,560 A | 5/1990 | Osaka et al. | |
| 4,931,427 A | 6/1990 | Chien | |
| 5,047,174 A | 9/1991 | Sherif | |
| 5,198,025 A | 3/1993 | Dausch | |
| 5,207,973 A | 5/1993 | Harris et al. | |
| 5,376,736 A * | 12/1994 | Mason | 525/439 |
| 5,409,683 A | 4/1995 | Tillotson et al. | |
| 5,466,483 A | 11/1995 | Niwa et al. | |
| 5,480,630 A | 1/1996 | Arai et al. | |
| 5,635,154 A | 6/1997 | Arai et al. | |
| 5,637,258 A | 6/1997 | Goldburt et al. | |
| 5,718,907 A | 2/1998 | Labarre | |
| 5,753,373 A * | 5/1998 | Scholz et al. | 428/429 |
| 5,770,216 A | 6/1998 | Mitchnick et al. | |
| 5,776,360 A | 7/1998 | Sieber | |
| 5,777,001 A | 7/1998 | Seeney et al. | |
| 5,804,645 A | 9/1998 | Matsuo | |
| 5,843,525 A | 12/1998 | Shibasaki et al. | |
| 5,928,723 A | 7/1999 | Koehlert et al. | |
| 5,962,608 A | 10/1999 | Ryang et al. | |
| 5,994,252 A | 11/1999 | Feige et al. | |
| 6,036,886 A | 3/2000 | Chhalora et al. | |
| 6,071,486 A | 6/2000 | Koehlert et al. | |
| 6,077,640 A | 6/2000 | Komai et al. | |
| 6,107,396 A | 8/2000 | Kweon et al. | |
| 6,139,816 A | 10/2000 | Liu et al. | |
| 6,169,119 B1 | 1/2001 | Ryang et al. | |
| 6,171,580 B1 | 1/2001 | Katsuyama et al. | |
| 6,200,680 B1 | 3/2001 | Takeda et al. | |
| 6,214,416 B1 * | 4/2001 | Sakagami et al. | 427/387 |
| 6,235,270 B1 | 5/2001 | Ishii et al. | |
| 6,303,091 B1 | 10/2001 | Mohri et al. | |
| 6,328,947 B1 | 12/2001 | Monden et al. | |
| 6,329,058 B1 | 12/2001 | Arney et al. | |
| 6,395,341 B1 | 5/2002 | Arakawa et al. | |
| 6,432,526 B1 | 8/2002 | Arney et al. | |
| 6,476,098 B1 | 11/2002 | Arakawa et al. | |
| 6,503,475 B1 | 1/2003 | McCormick et al. | |
| 6,527,825 B1 | 3/2003 | Gruenbauer et al. | |
| 6,586,096 B2 | 7/2003 | Border et al. | |
| 6,586,500 B2 * | 7/2003 | Bagrodia et al. | 523/209 |
| 6,599,631 B2 | 7/2003 | Kambe et al. | |
| 6,710,091 B1 | 3/2004 | Womestsdorf et al. | |
| 6,710,097 B2 | 3/2004 | Takase et al. | |
| 6,727,311 B2 * | 4/2004 | Ajbani et al. | 524/447 |
| 6,759,446 B2 * | 7/2004 | Lee et al. | 521/83 |
| 6,797,760 B1 * | 9/2004 | Ebrahimian et al. | 524/445 |
| 7,482,382 B2 | 1/2009 | Li et al. | |
| 7,498,381 B1 * | 3/2009 | de Puydt et al. | 524/711 |
| 2003/0130061 A1 | 7/2003 | Rajagopalan et al. | |
| 2003/0172845 A1 | 9/2003 | Marx et al. | |
| 2003/0176551 A1 | 9/2003 | Rediske et al. | |
| 2004/0176187 A1 | 9/2004 | Bissonnette et al. | |
| 2005/0045031 A1 | 3/2005 | Rajagopalan et al. | |
| 2005/0065266 A1 | 3/2005 | Yang et al. | |
| 2005/0215718 A1 | 9/2005 | Rajagopalan et al. | |

(Continued)

FOREIGN PATENT DOCUMENTS

DE 19907704 A1 8/2000

(Continued)

OTHER PUBLICATIONS

Machine translation of KR 2006077802 A, Jul. 5, 2006.*
Wypych, George. Handbook of Fillers, 2nd Edition. Toronto, ChemTec Publishing, 2000, p. 172. TP1114.W96.*
Agne, TH, et al., "Doping of the nanocrystalline semiconductor zinc oxide with the donor indium," Applied Physics Letters, vol. 83, No. 6, Aug. 11, 2003, pp. 1204-1206.
Bahnemann, Detlef W., et al., "Preparation and Characteriztion of Quantum Size Zinc Oxide: A Detailed Spectroscopic Study," J. Phys. Chem., 1987, 91, pp. 3789-3798.
H.A. Ali, et al, "Properties of self-assembled ZnO nanostructures", Solid-State Electronics 46 (2002) pp. 1639-1642.
Meulenkamp, Eric A., "Synthesis and Growth of ZnO Nanoparticles," J. Phys. Chem. B, 1998, 102, pp. 5566-5572.
Mikrajuddin Abdullah, et al., "In Situ Synthesis of Polymer Nanocomposit Electroytes Emitting a High Luminescence with a Tunable Wavelength" cont'd J. Phys. Chem B 2003, 107, pp. 1957-1961.

(Continued)

*Primary Examiner* — Vickey Nerangis
(74) *Attorney, Agent, or Firm* — Gardere Wynne Sewell LLP

(57) ABSTRACT

Nanocomposites and method of making same are provided using nanoplatelets. A nanocomposite is provided, and the nanocomposite includes nanoparticles, inorganic platelets, and a polymer material. A method is provided for dispersing nanoparticles into a polymeric material by using inorganic nanoplatelets.

16 Claims, 3 Drawing Sheets

U.S. PATENT DOCUMENTS

| | | | |
|---|---|---|---|
| 2005/0228140 | A1 | 10/2005 | Rajagopalan et al. |
| 2005/0255629 | A1 | 11/2005 | Han et al. |
| 2006/0020075 | A1* | 1/2006 | Basham et al. ............... 524/494 |
| 2007/0232741 | A1 | 10/2007 | Bhimaraj et al. |
| 2010/0015032 | A1 | 1/2010 | Magario et al. |
| 2012/0214008 | A1 | 8/2012 | Bhimaraj et al. |

FOREIGN PATENT DOCUMENTS

| | | | |
|---|---|---|---|
| JP | 04-357114 A | | 12/1992 |
| JP | H06212021 A | | 8/1994 |
| JP | 11217511 A1 | | 8/1999 |
| JP | 2003147090 | | 5/2003 |
| JP | 2004292282 A | | 10/2004 |
| JP | 2005089758 A | | 4/2005 |
| JP | 20060056772 | | 3/2006 |
| JP | 20090524734 | | 7/2009 |
| KR | 2006077802 A | * | 7/2006 |
| WO | WO-2007023919 A1 | | 3/2007 |
| WO | WO-2007075654 A2 | | 7/2007 |

OTHER PUBLICATIONS

Trindade, Tito, et al., "Nanocrystalline Semiconductors: Synthesis, Properties, and Perspectives," Chem. Mater, 2001, 13 pp. 3843-3858.

Wong, Eva M., et al., "ZnO quantum particle thin films fabricated by electrophoetic deposition," Applied Physics Letters, vol. 74, No. 20, May 17, 1999, pp. 2939-2941.

Spanhel, et al., "Semiconductor Cluster in the Sol-Gel Process: Quantized Aggregation, Gelation, and Crystal Growth in Concentrated ZnO Colloids," 113(8) J. Am. Chem. Soc. (1991) pp. 2826-2833.

Ning, et al. "Structure and Optical Properties of MgxZn1-xO Nanoparticles Prepared by Sol-Gel Method," Optical Materials 27(1) (Elsevier Sci. Pubs., B.V. Amsterdam, NL, Mar. 11, 2004) pp. 1-5.

Tokumoto, et al., "SAXS Study of the Kinetics of Formation of ZnO Colloidal Suspensions," 247(1-3) J. Non-Crystalline Solids (North-Holland Phys. Pub., Amsterdam, NL, Jun. 2, 1999) pp. 176-182.

Hu Z. et al., Influence of Solvent on the Growth of ZnO Nanoparticles, 2003, Journal of Colloid and Interface Science, vol. 263, pp. 454-460.

Sun et al., A CTAB-assisted hydrothermal orientation growth of ZnO nanorods, 2002, Materials Chemistry and Physics, vol. 78, p. 99-104.

Hung C-H et al: "Effect of surface stabilization of nanoparticles on luminescent characteristics in ZnO/poly(hydroxyethyl methacrylate) nanohybrid films"; Journal of Materials Chemistry, The Royal Society of Chemistry, Cambridge GB LNKD-DOI: 10.1039/B405497K, vol. 15, Sep. 16, 2004, pp. 267-274, XP002412933, SSN: 0959-9428.

Notice of Reasons for Refusal for Japanese Patent Appl. No. 518207/2010, mail date Aug. 14, 2012, 2 pgs.

Unofficial translation of Notice of Reasons for Refusal in Japanese Patent Appl. No. 518207/2010, prepared Sep. 7, 2012, 3 pgs.

* cited by examiner

POLYMER NANOCOMPOSITES INCLUDING DISPERSED NANOPARTICLES AND INORGANIC NANOPLATELETS

BACKGROUND OF THE INVENTION

1. Field of the Invention

The present invention relates to polymers and nanoparticles. In particular, the present invention relates to polymer nanocomposites and methods producing the same.

2. Background of the Art

Nano-sized materials have been investigated for use in mechanically enhancing or stabilizing polyolefins materials. Semiconducting materials have been widely used for optical and electrical applications. Additionally, as the size reduces to several nanometers (quantum scale), semiconducting materials show size-dependent optical, electric and thermal properties different from the bulk semiconductor materials, known as quantum size effects, which make the semiconductor nanocrystals attractive for industrial applications and may give rise to new opportunities for functional polymer/semiconductor nanocomposites.

Incorporating semiconductor nanocrystals into polymeric matrices is a common way to fabricate optical and electrical devices, such as solar cells, light-emitting diodes (LED) and photovoltaic devices. However, without special surface functionalization, no current methods have been able to disperse semiconductor nanocrystals in polymers under nano-scale conditions and control the nanoparticles dispersion. Instead, large aggregates have been observed to form in polymers that limit the use of semiconductor nanocrystals in polymers for optical and electrical applications with desired mechanical and thermal properties and stability.

The semiconductor material zinc oxide (ZnO) is being investigated for use with polymers. ZnO is an important and attractive semiconducting material because of its distinguished properties in optics, photonics and electronics. For example, ZnO particles are used as an UV absorber in sunscreens and cosmetics. ZnO is also much more resistant to radiation damage than other semi-conductor materials. Moreover, ZnO is produced through wet-chemistry, which offers greater processing potential for use with polymers.

Many methods to incorporate semiconductor nanocrystals into polymers have had limited results. For example, ZnO particles were used as a mechanical reinforcement agent for polyolefins. However, to improve such properties as tensile modulus, the amount of ZnO particles used was of such an amount considered unacceptable for practical and economic purposes. ZnO particles blended with polyethylene to improve thermal stability have also been required in an amount considered unacceptable for practical and economic purposes. Alternative methods, such as preparing ZnO nanocomposites with organic modified ZnO to improve thermal stability were found to be too expensive and impractical for mass production. ZnO particles that have been investigated as a UV stabilizer for polyolefins were also observed to have detrimental effects on other properties of the materials including lost of transparency of composites.

Additionally, ZnO nanoparticles are observed to have inhomogeneous dispersion into polymer matrices by conventional processes, such as melt blending processes. Further, polymer matrices from conventional processes are observed to have large ZnO aggregates and both the size distribution ranging from 30-200 nm and the shapes of ZnO nanoparticles were not uniform. The presence of aggregates results in less than desired optical and/or electrical properties in the form of composites. Alternative processes including composition mixing of polymers and nanoparticles, in-situ polymerization of polymer/semiconductor nanocomposites, and in-situ synthesis of semiconductor/polymer nanocomposites are also observed to result in undesirable particle aggregates, inhomogeneous dispersion of the particles, and/or unacceptable levels of impurities, which all can lead to less than desirable composite physical and/or mechanical properties. Further, consistent nano-scaled dispersion of nanoparticles and controlling the state of dispersion have not yet been achieved.

To date, methods to incorporate ZnO particles and other materials into polymeric materials to form polymer nanocomposite materials for optoelectronic applications with improved stability or enhanced mechanical properties have met with limited success.

Accordingly, there is a need for forming polymer nanocomposites with effectively dispersed materials therein.

BRIEF SUMMARY OF THE INVENTION

In one embodiment of the invention, a novel polymer nanocomposite includes a nanoparticle, an inorganic nanoplatelet, and a polymer material. In another embodiment of the invention, a method is provided for forming a polymer nanocomposite. The method involves dispersing nanoparticles into a polymeric material by using inorganic nanoplatelets.

The following paragraphs 1-12 summarize some of the inventive features disclosed herein and are additionally included for support of claims in states and regions wherein multiple dependent claims are permissive, and cost effective:

1. A polymer nanocomposite comprising: inorganic nanoparticles; inorganic nanoplatelets; and a polymer material.
2. The polymer nanocomposite of paragraph 1, wherein the nanoparticles are selected from the group consisting of a metal oxide, an elemental particle and combinations thereof.
3. The polymer nanocomposite of paragraphs 1-2, wherein the metal oxide is selected from the group consisting of zinc oxide, titanium oxide, and combinations thereof, and the elemental particle is selected from the group consisting of silver, gold, and combinations thereof.
4. The polymer nanocomposite of paragraphs 1-3, wherein the nanoparticles have an average particle size between about 1 nanometer and about 20 nanometers.
5. The polymer nanocomposite of paragraphs 1-4, wherein the nanoparticles have an average particle size between about 1 nanometer and about 10 nanometers.
6. The polymer nanocomposite of paragraphs 1-5, wherein the nanoparticles comprise between about 0.1 wt. % and about 4 wt. % of the polymer nanocomposite.
7. The polymer nanocomposite of paragraphs 1-6, wherein the inorganic nanoplatelets comprise one or more elements selected from the group consisting of aluminum, silicon, magnesium, zirconium, titanium, halfnium, and combinations thereof.
8. The polymer nanocomposite of paragraphs 1-7, wherein the inorganic nanoplatelets are selected from the group consisting of alpha-zirconium phosphate, titanium phosphate, halfnium phosphate, montmorrillonites, smectites, bentonites, and combinations thereof.
9. The polymer nanocomposite of paragraphs 1-8, wherein the inorganic nanoplatelets comprise between about 0.05 wt. % and about 5 wt. % of the polymer nanocomposite.
10 The polymer nanocomposite of paragraphs 1-9, wherein the inorganic nanoplatelets have a thickness between about 0.5 and about 1.5 nm.
11. The polymer nanocomposite of paragraphs 1-10, wherein the polymer comprises one or more polymer materials selected from the group consisting of a (meth)acrylic resin, styrenic resin, polycarbonate resin, polyester resin, epoxy resin, epoxidized phenolic resin, phenylenevinytene resin, fluorene resin, fluorenevinylene resin, phenylene resin, thiophene resin, and combinations thereof.

12. The polymer nanocomposite of paragraphs 1-11, wherein the polymer comprises one or more polymer material selected from the group consisting of a polymethylmethacrylate, polybutylacrylate, methlymethacrylate-butylacrylate copolymer, methylmethacrylate-styrene copolymer, polystyrene, styrene-acrylonitrile copolymer, styrene-isobutyrene copolymer, styrene-butylacrylate copolymer, polyethylene terephalate, polybutylene terephthalate, bisphenol-A epoxy resin, bisphenol-F epoxy resin, poly(2-methoxy-5-ethylhexyloxy-1,4-phenylenevinylene), poly(9,9-di-(2-ethylhexyl)-fluorenyl 2,7-diyl), poly(9,9-dioctylfluorenyl-2,7-diyl), poly(9,9-dihexylfluorenyl-2,7-divinylene-fluorenylene), poly(9,9-dihexyl-2,7-(2-cyanodivinylene)-fluorenylene), poly(2,5-dioctyl-1,4-phenylene), poly[2-(6-cyano-6-methlyheptyloxy)-1,4-phenylene], poly(3-hexylthiophene), and combinations thereof.

BRIEF DESCRIPTION OF THE DRAWINGS

For more complete understanding of the features and advantages of the present invention, reference is now made to the detailed description of the invention along with the accompanying Figs., wherein.

DETAILED DESCRIPTION OF THE INVENTION

Figure 1:
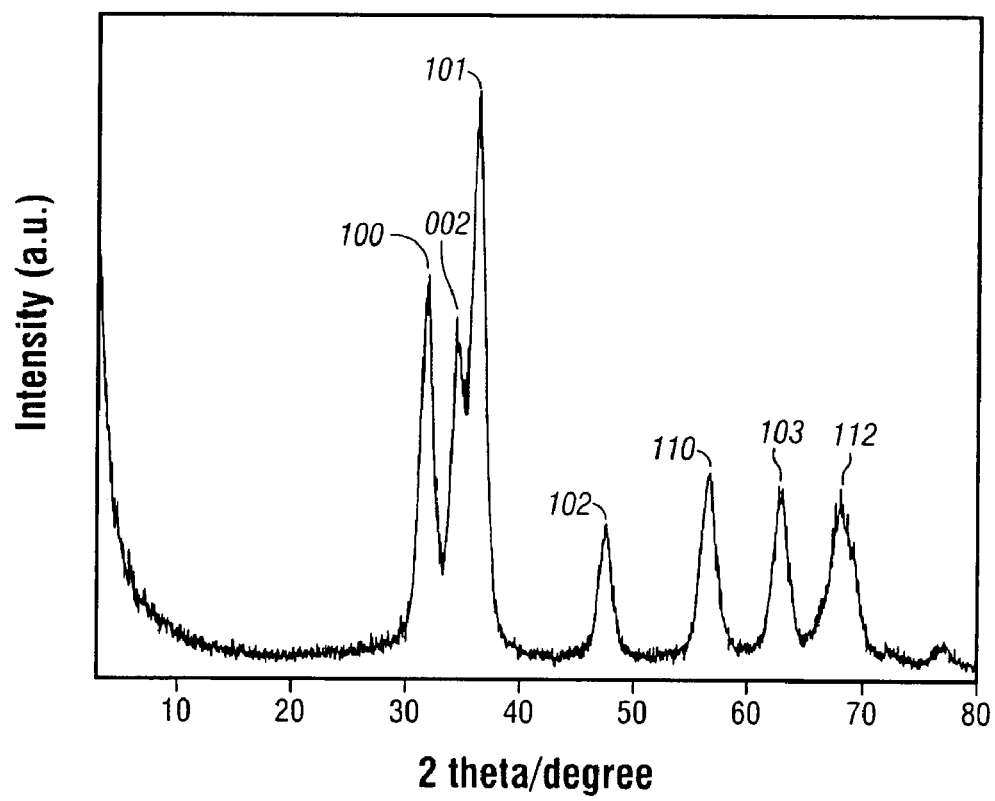
FIG. 1 is a X-ray diffraction (XRD) pattern of colloidal zinc oxide (ZnO) nanoparticles.

The present invention relates to the formation of polymer nanocomposites. In one embodiment of the invention, a polymer nanocomposite comprises a polymer containing dispersed nanoparticles and nanoplatelets. The polymer nanocomposite may be formed by mixing a first composition of nanoparticles, a second composition of nanoplatelets, and a third composition of a polymer material. Alternatively, for some polymeric materials, further processing steps to form the nanocomposite may be performed, such as precipitation and/or curing.

In one embodiment of the polymer nanocomposite, the nanoparticles may comprise inorganic particles. Suitable inorganic particles include one or more materials selected from the group consisting of oxides, elemental metals, and combinations thereof, of which oxides are preferred. Examples of suitable oxide nanoparticles include one or more materials selected from the group consisting of zinc oxide, titanium oxide, and combinations thereof. Examples of suitable elemental metals include one or more materials selected from the group consisting of gold, silver, and combinations thereof. The nanoparticles may comprise up to about 50 wt. % of the nanocomposite, such as up to about 30 wt. % of the nanocomposite. In one embodiment of the nanocomposite, the nanoparticles may comprise between about 0.05 weight percent (wt. %) and about 5 wt. % of the polymer nanocomposite, such as between about 0.1 wt. % and about 4 wt. % of the polymer nanocomposite, for example, about 1 wt. %.

Alternatively, the nanoparticles may comprise organic materials including phase-separated nanoparticles including, but not limited to, polyethersulfone and teflon, and rubber based nanoparticles, including, but not limited to, butadiene rubber.

A nanoparticle may be defined herein as a particle of material having three dimensions less than 100 nm. For example, a nanoparticle may have length, width, and height of less than 50 nm each. Preferably, the nanoparticle may have length, width, and height of about 20 nm or less respectively. The nanoparticle may also be defined as a particle having three dimensions within a ratio of about 1:1 to 2:1 of the respective dimensions. For example, a nanoparticle may have a length, width, and height ratio of between about 1:1:1 and 2:1:1, 1:2:1, 1:1:2, 2:2:1, 1:2:2, or 2:1:2. Nanoparticles may be in the shape of spheres, ovoids, cubes, pyramidal, or other three-dimensional shapes having the dimensions and/or ratios described herein.

Suitable nanoparticles may have a number-average particle size between about 0.1 nanometer and less than about 100 nanometers, such as between about 1 nanometer and about 20 nanometers, with the size being the average of the three dimensions of the particle, height, width, and length. Suitable nanoparticles have a number-average particle size between about 1 nanometer and about 10 nanometers, such as between about 2 nanometer and about 6 nanometers. The nanoparticles may have a standard deviation in particle size distribution between about 0.1 nanometers and about 5.0 nanometers, such as between about 0.1 nanometers and about 3.0 nanometers. Suitable nanoparticles may include aggregates of nanoparticles if the aggregates have the number-average particle size and the particle size distribution described above and may have aggregate sizes up to about 100 nm, such as between about 1 nm and about 50 nm.

A nanoplatelet may be defined herein as a particle of material having one dimension less than 100 nm and two dimensions of about 100 nm or greater. For example, a nanoplatelet may have a height or thickness less than 50 nm, such as less than 20 nm, for example, between about 0.01 nm and less than about 5 nm, and a length and width of about 100 nm or greater. The nanoplatelet may also be defined as a particle having three dimensions with one of the respective dimensions having a ratio to the other dimensions of less than 1:2:2. For example, a nanoplatelet having a height, width, and length may have a ratio of height to width to length of less than 1:2:2, such as between about 1:10000:10000 and about 1:3:3, including between about 1:200:200 and about 1:10:10 for example, between about 1:100:100 and about 1:30:30. An example of a nanoplatelet having a height to width to length ratio of about 1:20:20 is a nanoparticle having a height or thickness of about 5 nm and a width and a length of about 100 nm. Nanoplatelets may be in the shape of rectangles, square-shaped, hexagons, circles, or irregular features with the dimension stated herein. An example of such a structure having the ratios described herein is a clay structure, for example, the structure of montmorillonite clay.

Suitable inorganic nanoplatelets may have a number-average thickness between about 0.1 nanometer and about 5 nanometer and a number-average length (long side) between about 10 nanometer and about 1000 nanometers. Preferred inorganic nanoplatelets may have a number-average thickness less than 50 nanometers, such as between about 0.5 nanometer and about 1.5 nanometers, for example, at about 1 nanometer and may have a number-average length between 50 nanometers and about 500 nanometers, for example, at about 100 nanometers. Observed TEM images of nanoplatelets formed by the processes described herein had an average length and width of approximately 100 nm.

The nanoparticles may be synthesized by various techniques, for example, by a sol-gel method. In general, the sol-gel method involves the mechanism of a transition of a system from a liquid sol into a solid gel phase. The liquid sol is substantially a suspension of small particles in a liquid known as a substantially a colloidal suspension. The nanoparticles may be synthesized by reacting, under sol-gel conditions, a precursor with an alcohol-based composition and an alkali metal hydroxide. The nanoparticles may be manufactured by other processes known in the art, and the sol-gel conditions described herein are used to illustrate the invention and should not be construed or interpreted as limiting the scope of the invention.

Suitable oxide precursors may be any compound that can be converted into an oxide by reaction. Suitable oxide precursors include metal salts selected from the group consisting of acetates, carboxylates, dichlorides, nitrates, oleates, and their respective hydrates. For example, ZnO nanoparticles may be derived from a zinc acetate dihydrate precursor. If a hydrate is added to the reaction, the hydrate may be hydrolyzed in an alcohol-based composition prior to exposure to the alkali metal hydroxide.

The alcohol-based composition may be any composition that contains alcohol and, optionally, a secondary component. The alcohol-based composition may have a secondary component comprising between about 1 wt. % and less than about 50 wt. %, such as between about 1 wt. % and less than about 30 wt. %, of the composition to be processed into a sol gel. Suitable alcohols may be selected from the group consisting of methanol, ethanol, propanol, 2-propanol, and combinations thereof. Suitable secondary components include water and organic solvents such as acetone, methylethylketone and tetrahydrofuran. Additional information regarding nanoparticle and polymer solutions is disclosed at page 9, line 1, to page 23, line 20 (paragraphs [0027]-[0070] of US Publication No. 2005/0260122) in co-pending U.S. patent application Ser. No. 10/848,882, filed on May 19, 2004, which is incorporated herein by reference to the extent not inconsistent with the claims and aspects described herein.

Suitable alkali metal hydroxides are selected from the group of lithium hydroxide, sodium hydroxide, potassium hydroxide, rubidium hydroxide, cesium hydroxide, francium hydroxide, and combinations thereof. The inventors believe that the alkali metal hydroxide aids in converting the precursor into the nanoparticles.

Reaction parameters generally include the pH, temperature, and pressure of the reaction. The pH of the reaction mixture may be at least about 7.0. Alternatively, the pH of the reaction mixture is between about 7.5 and about 10.5. During the reaction, the reaction temperature may be between about 10° C. and about 10° C. The reaction pressure may range from a vacuum to 2 MPa. Alternatively, the reaction pressure may be atmospheric pressure. The reaction may be performed in a chemically inert atmosphere.

One embodiment of the sol-gel process, Colloidal ZnO nanoparticles were prepared by hydrolyzing zinc acetate dehydrate ($Zn(OAc)*2H_2O$) in the basic methanol composition. Potassium hydroxide (KOH) (99.99%, Sigma-Aldrich) was first dissolved in methanol to get a homogeneous composition to form the basic methanol composition. A composition of zinc acetate dihydrate (99%, Fluka)/methanol was added directly into the basic methanol composition to form a starting sol. The reaction stoichiometry of the zinc acetate dihydrate to the KOH in the reaction mixture may be between about 1:0.1 and about 1:3, for example, at about 1:2. The compositions were combined to produce concentrations of [metal salt$^{2+}$] and [alkali metal$^+$], within the range of molar ratio of [metal salt$^{2+}$]:[alkali metal$^+$] between about 1:0.1 and about 1:3, for example, for a preferred molar ratio of [$Zn^{2+}$]/[$K^+$]=1:2, were prepared to be 0.04 and 0.08 M, respectively (the concentration of $Zn^{2+}$ may be between 0.001 to 1 M, for example, 0.04 M). This starting sol having the colloid can then be concentrated between about 3 and about 20 times, such as by 10 times. A rotary evaporation under vacuum may be used to concentrate the sol. During the reaction, the pH of the composition was maintained at neutral and basic pH levels of about 7.0 or higher.

The ZnO can then be precipitated from the colloid. ZnO nanoparticles may be precipitated by adding an organic nonsolvent, such as hexane and isopropanol into the concentrated ZnO methanol colloid. The volume ratio of hexane: concentrated ZnO methanol colloid:isopropanol may be between about 3:1:1 and about 10:1:1, for example, at a volume ratio of about 5:1:1. The ZnO precipitate is then separated by a suitable process such as centrifugation. The ZnO precipitate may then be re-dispersed in an alcohol-based composition to purify the ZnO nanoparticles. The purified ZnO nanoparticles may then be re-dispersed in methanol for nanocomposites preparation.

The nanoplatelets may be a nature-layered, or layered, material, such as clay, or a synthetic material, such as zirconium phosphate (ZrP). Suitable inorganic nanoplatelets comprise materials having one or more elements selected from the group consisting of aluminum, silicon, magnesium, zirconium, titanium, halfnium, rutherfordium, and combinations thereof. Examples of suitable inorganic nanoplatelets include one or more materials selected from the group consisting of alpha-zirconium phosphate, titanium phosphate, halfnium phosphate, montmorrillonites, smectites, bentonites, and combinations thereof. The nanoplatelets may comprise between about 0.05 wt. % and about 20 wt. % of the polymer nanocomposite, such as between about 0.1 wt. % and about 10 wt. % of the polymer nanocomposite including between about 0.1 wt. % and about 4 wt. % of the polymer nanocomposite, for example, about 0.5 wt. %. It is believed that the nanoplatelets improve the dispersion of nanoparticles in a polymer allowing a more effective use of nanoparticles in nanocomposite polymers as compared to conventional nanocomposite polymer. Alternatively, other particles, such as needle-shaped particles, in the nano-sized ranges disclosed herein may be added or substitute the nanoplatelets described herein.

Layered material nanoplatelets, such as montmorrillonites, smectites, bentonites, and combinations thereof, may be exfoliated in colloids, which colloids are defined herein as dispersed and exfoliated nanoplatelets in a media. The nanoplatelets may be prepared by a gel process or formed from a clay material. In one embodiment of a gel process, the nanoplatelets may be synthesized by exfoliating, under sol-gel conditions, a prepared nanoplatelet material with a basic hydroxide. Exfoliated nanoplatelets are defined herein as nanoplatelets individually dispersed in a media without a regular, or irregular, spacing between the nanoplatelets. In the invention, however, exfoliation of 100% nanoplatelets is not required but exfoliation of more than 50% nanoplatelets is preferable. Suitable base hydroxides include alkylamine hydroxides. Examples of suitable alkyl amine hydroxides include Jeffamine, alkyl ammonium hydroxides, such as tetra-n-butylammonium hydroxide, and combinations thereof.

For synthetic, non-layered materials, such as alpha-zirconium phosphate, the nanoplatelet material may be prepared from a precursor. Suitable precursors may be any compound that can be converted into a phosphate by reaction. Suitable precursors include metal salts selected from the group consisting of nitrates, chlorides, and the respective hydrates. For example, alpha-zirconium phosphate may be derived from a zirconium chloride hydrate ($ZrOCl_2 \cdot 8H_2O$) precursor.

In one embodiment of the nanoplatelet formation process, α-ZrP nanoplatelets were synthesized by refluxing zirconyl chloride ($ZrOCl_2 \cdot 8H_2O$, Fluka) in the presence of phosphoric acid ($H_3PO_4$). The α-ZrP material was then washed and collected. The α-ZrP material was then dried and ground into fine powders.

The prepared synthetic material, α-ZrP, or clay-based materials, may then be exfoliated by a base hydroxide, such as tetra-n-butylammonium hydroxide ($TBA^+OH^-$) in water. The molar ratio of α-ZrP to base hydroxide may be between about 1:0.6 and about 1:1.2, for example at a molar ratio of α-ZrP:TBA of about 1:0.8. The exfoliated α-ZrP nanoplatelets may then be centrifuged, collected, and condensed as a gel form. The supernatant of the gel may then be removed, and the α-ZrP nanoplatelets may then be mixed with an organic solvent, such as acetone, to remove the remaining water and to obtain exfoliated α-ZrP nanoplatelets.

The polymer material may comprise one or more polymeric materials. The polymeric material may include thermoplastic resins and thermosetting resins. Suitable thermoplastic resin polymeric materials include polymeric materials having a number average molecular weight (Mn) of greater than about 5,000. Suitable thermosetting resin polymeric materials, such as epoxy resin, include epoxy materials having a molecular weight between about 100 and about 5000. The Mn of the polymer is measured by gel permeation chromatography with a calibration of standard polystyrenes. The nanoparticles and nanoplatelets may be used with additional polymeric materials and non-polymeric materials, and the above-described polymeric materials are provided to illustrate the invention and should not be construed or interpreted as limiting the scope of the invention.

Examples of suitable polymeric materials of the thermoplastic resin include (meth)acrylic resin, such as polymethylmethacrylate, polybutylacrylate, methlymethacrylate-butylacrylate copolymer, and methylmethacrylate-styrene copolymer, styrenic resin, such as polystyrene, styrene-acrylonitrile copolymer, styrene-isobutyrene copolymer, and styrene-butylacrylate copolymer, polycarbonate resin, polyester resin, such as polyethylene terephalate and polybutylene terephthalate, phenylenevinylene resin, such as poly(2-methoxy-5-ethylhexyloxy-1,4-phenylenevinylene), fluorene resin, such as poly(9,9-di-(2-ethylhexyl)-fluorenyl 2,7-diyl) and poly(9,9-dioctylfluorenyl-2,7-diyl), fluorenevinylene resin, such as poly(9,9-dihexylfluorenyl-2,7-divinylene-fluorenylene) and poly(9,9-dihenyl-2,7-(2-cyanodivinylene)-fluorenylene), phenylene resin, such as poly(2,5-dioctyl-1,4-phenylene) and poly[2-(6-cyano-6-methlyheptyloxy)-1,4-phenylene], thiophene resin, such as poly(3-hexylthiophene), and combinations thereof. Examples of suitable polymeric materials of the thermoplastic resin include epoxy resin, such as bisphenol-A epoxy resins, bisphenol-F epoxy resin and epoxidized phenolic resin, and phenolic resin, such as resole and novolac. Examples of specific resins include Diglycidyl ether of bisphenol-A (DGEBA) epoxy resin (D.E.R.™ 332 epoxy resin, The Dow Chemical Company), which has an average epoxide equivalent weight of 174 and D.E.R 331 DGEBA epoxy resin (The Dow Chemical Company), which has an average epoxide equivalent weight of 190.

The polymer material is preferably dissolved before the nanoparticles and polymer material are mixed in an alcohol-based composition. If the polymer material is insolvent or has limited solubility in the alcohol-based composition, an organic solvent may be used to dissolve the polymer material. The polymer material may be dissolved in the organic solvent before it is added to the alcohol-based composition or the organic solvent can be added to the alcohol-based composition prior to the addition of the polymer material and the nanoparticles and inorganic platelets. The amount of organic solvent used, by weight, in relation to the weight of the alcohol-based composition with variation on the composition of the individual components. For example, the ratio of organic solvent to alcohol may be about 8:1 for some compositions formed with the materials and processes described herein.

Suitable organic solvents include acetone, dichloromethane, methylethylketone, tetrahydrofuran, toluene, and combinations thereof. In one embodiment of the formation process, the polymer material may be dissolved in the presence of a solvent and the nanoplatelets. For example, if the nanoplatelets are dissolved in acetone and the polymer material may be dissolved in the same solvent, the polymer material and inorganic nanoplatelets may be dissolved in the same solvent, such as acetone. Alternatively, some polymeric materials are soluble in an alcohol-based composition. In these cases, the nanoparticles, inorganic platelets, and polymer material may be added directly to the alcohol-based composition, wherein the polymer material will dissolve and mix with the nanoparticles and inorganic platelets.

The respective components are mixed together according to the methods described herein and a composition of the polymer material, the nanoparticles, the nanoplatelets and the solvent is obtained. The polymer nanocomposite may be isolated by evaporation of the solvent. Optionally, the composition may be poured into an organic solvent to precipitate the polymer nanocomposite, which precipitates can then be isolated by means of centrifugation and decantation and then dried.

Polymer nanocomposites formed from epoxy resins may be cured. A curing agent may then be added into the polymer nanocomposite as necessary in stoichiometric amount. For example, a curing agent is added to the epoxy resin stoichiometrically. Suitable curing agents include sulfones, such as 4,4'-diamino-diphenyl sulfone (DDS), 2-ethyl-4-methyl lmidiazol, triethylenetetramine, Ancamine 1618 (from Air Products), aliphatic amines, such as tetraethylene pentamine (TEPA), and combinations thereof.

The cure condition is changed depending on the type of epoxy resin and curing agent. For example, an epoxy containing nanoparticles, such as zinc oxide, and nanoplatelets, such as zirconium phosphate, was poured into a pre-heated mold, cured at 80° C. for 24 hrs, and then post-cured at 100° C. for 3 hrs in the oven. After curing, the sample was left in the oven until cooled to room temperature. The resulting polymer nanocomposite comprises cured epoxy/ZnO/α-ZrP. Technical data sheet of an epoxy resin and a curing agent, which is provided by the suppliers, would suggest a suitable condition.

EXAMPLES

The following examples and comparative examples are provided to demonstrate particular embodiments of the present invention. It should be appreciated by those of skill in the art that the methods disclosed in the examples and comparative examples that follow merely represent exemplary embodiments of the present invention. Those of skill in the art should, in light of the present disclosure, appreciate that many changes can be made in the specific embodiments described and still obtain a like or similar result without departing from the spirit and scope of the present invention.

In the examples and comparative examples, measurements and evaluations were made as follows.

The average particle size of α-ZrP nanoplatelets can be observed from TEM photographs. Alternatively, an average particle size of ZnO particles in an alcohol based composition may be based the following equation provided by Meulenkamp [E. A. Meulenkamp, *J. Phys Chem. B*, 102, 5566-5572 (1998)] to convert the measured values of $\lambda_{1/2}$ (the wavelength at which the absorption is the half of that at the shoulder) into particle sizes based on the size determination result from TEM micrographs and XRD line broadening:

$$1240/\lambda_{1/2} = a + b/D^2 - c/D$$

where a=3.301, b=294.0 and c=−1.09; and, D is the diameter. The UV absorption was measured in UV-vis spectrophotometer (UV 1601) made by SHIMADZU CO.

X-ray diffraction (XRD) powder patterns of the ZnO nanoparticles and α-ZrP nanoplatelets were generated by a Bruker D8 Advanced Powder X-ray Diffi-actometer with Cu—$K_\alpha$ incident radiation ($\lambda$=1.5418 Å). After washing, the ZnO precipitates were dried at 110° C. for 2 hrs and the powders were ground by using a set of mortar and pestle for the XRD study.

High resolution transmission electron microscopy (HR-TEM) of purified ZnO nanoparticles and epoxy nanocomposites was carried out using a JEOL 2010 transmission electron microscope operated at 200 kV. Purified ZnO nanoparticles were first re-dispersed in methanol and diluted, followed by placing a droplet of the composition onto a 400-mesh carbon-coated copper grid. The grid was then dried in a desiccator for one day before imaging. The epoxy nanocomposites for HR-TEM were prepared by using ultramicrotomy. A Reichert-Jung Ultracut-E microtome was utilized to prepare thin sections with the thickness of around 70-100 nm.

Average particle size and particle size distribution of ZnO particles in the polymer nanocomposite was observed by using Transmission electron microscopy (TEM). TEM pictures were observed to find the average particle size and the particle size distribution of ZnO particles dispersed within the polymer nanocomposites. TEM images were recorded using a JEOL JEM-1200EX instrument (80 kV). Heat-pressed samples were cut into ultra thin sections for use in the TEM. The TEM image analysis was conducted using more than 200 particles in the image with a magnification of 400,000.

UV-vis spectra of neat epoxy and nanocomposites were recorded oil an Ocean Optics USB2000-DT-Mini Spectrometer. The samples were cut and polished using #1200, #2400, and #4000 sand papers sequentially to achieve surface smoothness for investigation. Final polishing of the sample surface was done by using 1 μm diamond paste on a cloth for transmittance measurements. The sample thickness was prepared to be within 2±0.05 mm.

Tensile properties of the polymer nanocomposites based on DGEBA+DDS were obtained through the ASTM D638-98 method. The tensile tests were performed using an MTS® servo-hydraulic test machine at a crosshead speed of 5.08 mm/min at ambient temperature. The Young's modulus of each sample was measured on at least four specimens and the average values and standard deviations were reported. Glass transition temperature ($T_g$) was determined using a Differential Scanning Calorimeter (DSC) at a heating rate of 110° C./min with a nitrogen flow of 80 mL/min.

Example 1

Synthesis and Purification of Colloidal ZnO Nanoparticles

Colloidal ZnO nanoparticles were prepared by hydrolyzing zinc acetate dehydrate ($Zn(OAc)*2H_2O$) in the basic methanol composition. Sixteen mmol of KOH (99.99%, Sigma-Aldrich) was first dissolved in 150 mL methanol at 60° C. with refluxing and stirring for 30 minutes to get a homogeneous composition. Subsequently, 50 mL of 0.16M zinc acetate dihydrate (99%, Fluka)/methanol composition was added directly into the basic methanol composition. The reaction stoichiometry of the zinc acetate dihydrate to the KOH in the reaction mixture was 1:2. The concentrations of $[Zn^{2+}]$ and $[K^+]$, having a molar ratio of $[Zn^{2+}]/[K^+]$=0.5, were prepared to be 0.04 and 0.08 M, respectively. This starting sol was then aged at 60° C. with refluxing and stirring. After 2 hours of reaction, the colloid was concentrated by 10 times at 40° C. via rotary evaporation under vacuum. During the reaction, the pH of the composition was maintained at 7.0 or higher, and the final pH was 8.7.

White ZnO nanoparticles precipitated immediately after adding hexane and isopropanol into the concentrated ZnO methanol colloid with a volume ratio of hexane: concentrated ZnO methanol colloid:isopropanol=5:1:1. The mixture was maintained at 0° C. overnight until the ZnO nanoparticles were fully precipitated and settled to the bottom of the container. After centrifugation and removal of the supernatant, the ZnO precipitate was re-dispersed in methanol by hand-shaking. The above operations were repeated at least two times to purify the ZnO nanoparticles in methanol. The purified ZnO nanoparticles were re-dispersed in methanol for nanocomposites preparation. The yield of the purified ZnO nanoparticles was calculated by drying the appropriate volume of the ZnO/methanol composition in air, baking in an oven at 10° C., and weighing the leftover ZnO powder. The amount of ZnO nanoparticles added into the polymers was estimated through the calculated yield.

A TEM observation of the colloidal ZnO nanoparticles synthesized indicated spherical particles with a uniform size-distribution. The average particle size was estimated to be around 5 nm. The ZnO nanoparticles were also observed to be crystalline. FIG. 1 is the XRD powder pattern (FIG. 1), which exhibits the Wurtzite structure of ZnO, the calculation of average particle size based on the Debye-Scherrer formula t=0.89$\lambda$/($\beta$ cos $\theta$) (t stands for the average diameter of the particles; $\lambda$, the X-ray wavelength, 1.5418 Å; $\beta$, full width at half maximum, FWHM, of the diffraction peak; and $\theta$, the diffraction angle) yields the particle diameter to be around 5 nm, which is consistent with the TEM observation.

Example 2

Synthesis and Exfoliation of α-ZrP Nanoplatelets

The α-ZrP nanoplatelets were synthesized through a refluxing method in which 20.0 g $ZrOCl_2.8H_2O$ (Fluka) was refluxed in 200.0 mL 3.0 M $H_3PO_4$ in a Pyrex glass flask with stirring at 100° C. for 24 hrs. After the reaction, the products were washed and collected by centrifugation three times.

Then, the α-ZrP nanoplatelets were dried at 65° C. in an oven for 24 hrs. The dried α-ZrP was ground with a set of mortar and pestle into fine powders.

The α-ZrP prepared was then exfoliated by tetra-n-butylammonium hydroxide (TBA⁺OH⁻, Aldrich) in water with a molar ratio of α-ZrP: TBA=1:0.8. The well-exfoliated α-ZrP nanoplatelets in water were first centrifuged at 12,000 rpm to collect exfoliated α-ZrP nanoplatelets. These exfoliated α-ZrP nanoplatelets were condensed as a gel form after centrifugation and the supernatant could then be easily removed. After the removal of supernatant, the same amount of acetone was mixed with the α-ZrP gel obtained from the centrifugation. The mixture was sonicated for one hour and then shaken overnight to re-disperse α-ZrP nanoplatelets into acetone. This centrifugation and re-dispersion process was repeated three times to remove most of water and to obtain exfoliated α-ZrP nanoplatelets in acetone. The supernatants separated after each of the three centrifugations were collected and heated in an oven at 120° C. to remove solvent and obtain the α-ZrP left in the supernatants. Thus, the exact amount of α-ZrP that was exchanged into acetone can be calculated.

Figure 2:
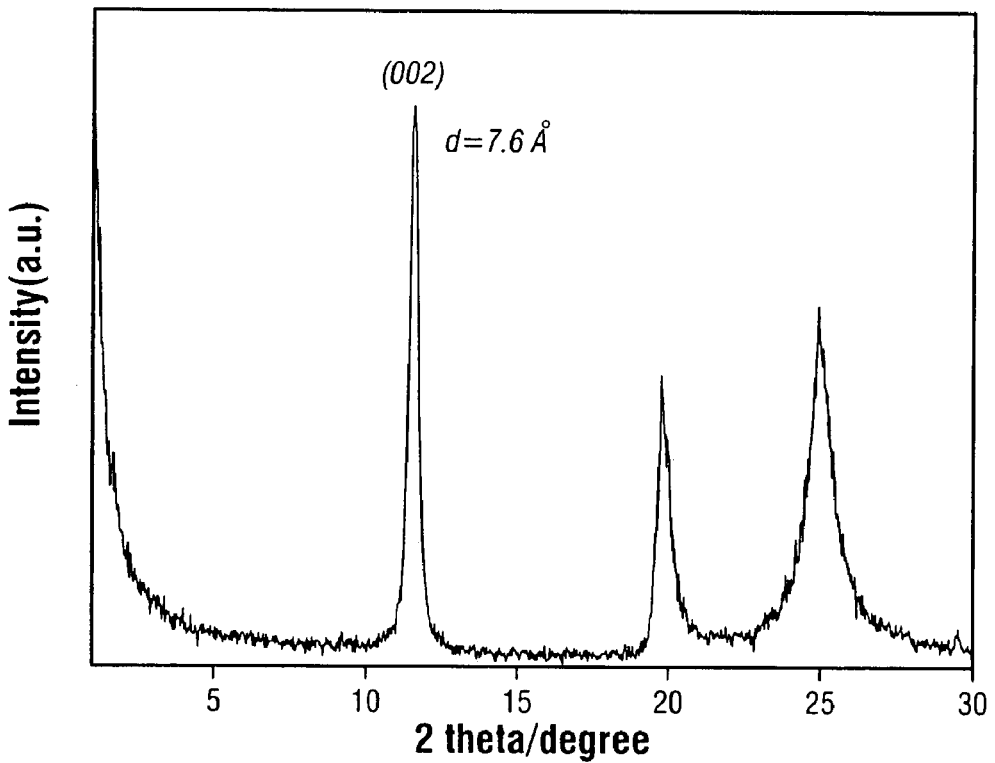
FIG. 2 is a X-ray diffraction (XRD) pattern of alpha zirconium phosphate (α-ZrP) nanoplatelets.

FIG. 2 shows the typical XRD powder pattern of α-ZrP nanoplatelets. The sharp diffraction peaks indicate that a high crystallinity has been formed. Usually, α-ZrP nanoplatelets synthesized from refluxing zirconyl chloride in 3 M phosphoric acid at 100° C. for 24 hrs have an average long-dimension of around 100 nm. The α-ZrP single nanoplatelet was confirmed to be an average length of around 100 nm by TEM observation.

Example 3

Preparation of the Polymer Nanocomposites

Diglycidyl ether of bisphenol-A (DGEBA) epoxy resin (D.E.R.™ 332 epoxy resin, The Dow Chemical Company) with an average epoxide equivalent weight of 174 was first dissolved in acetone with exfoliated α-ZrP nanoplatelets in a flask, and then the methanol containing re-dispersed ZnO nanoparticles was added into the above composition. Subsequently, the solvents were removed in a under vacuum at 80° C. After solvent evaporation, the epoxy resin containing both nanoparticles and nanoplatelets was degassed at 100° C. for 1 hr. The curing agent, 4,4'-diamino-diphenyl sulfone (DDS, Aldrich), was then added into the epoxy resin stoichiometrically. This mixture was heated up rapidly to 130° C. until the DDS was dissolved and then poured into a pre-heated glass mold with mold release agent on the glass mold surfaces. DDS-cured epoxy is herein referred to as epoxy-D and ancamine-cured epoxy is herein referred to as epoxy-A.

The epoxy was cured at 180° C. for 2 hrs and then post-cured at 220° C. for another 2 hrs in the oven. After curing, the sample was left in the oven until cooled to room temperature. This sample is designated as epoxy-D/ZnO/α-ZrP or polymer nanocomposites. For comparison purposes, neat epoxy sample without nano-materials (neat epoxy-D), epoxy with only ZnO nanoparticles (Epoxy-D/ZnO), epoxy with only α-ZrP nanoplatelets (Epoxy-D/α-ZrP), and epoxy with ZnO nanoparticles and TBA (Epoxy-D/ZnO/TBA) were prepared through the same curing procedure.

In addition, DGEBA epoxy resin (D.E.R.™ 331 epoxy resin, The Dow Chemical Company) with an average epoxide equivalent weight of 190 was first dissolved in acetone with exfoliated α-ZrP nanoplatelets in a flask, and then the methanol containing re-dispersed ZnO nanoparticles was added into the above composition. Subsequently, the solvents were removed in a rotary evaporator under vacuum at 80° C. After solvent evaporation, the epoxy resin containing both nanoparticles and nanoplatelets was degassed at 80° C. for 1 hr and then cooled to room temperature. The curing agent, Ancamine 1618 (Air Products), was added into the epoxy resin according to the manufacture's recommendation.

After mixing, the epoxy was poured into a pre-heated mold, cured at 80° C. for 24 hrs, and then post-cured at 100° C. for 3 hrs in the oven. After curing, the sample was left in the oven until cooled to room temperature. This polymer nanocomposite sample was designated as epoxy-A/ZnO/α-ZrP. The epoxy-A/ZnO/α-ZrP nanocomposite comprises 0.5 wt. % of ZnO nanoparticles and 0.5 wt. % of α-ZrP nanoplatelets of the nanocomposite.

For comparison purposes, neat epoxy sample without nanomaterials (neat epoxy-A), epoxy with only ZnO nanoparticles epoxy-A/ZnO, and epoxy with only α-ZrP nanloplatelets epoxy-A/α-ZrP were prepared through the same curing procedure.

Figure 3:
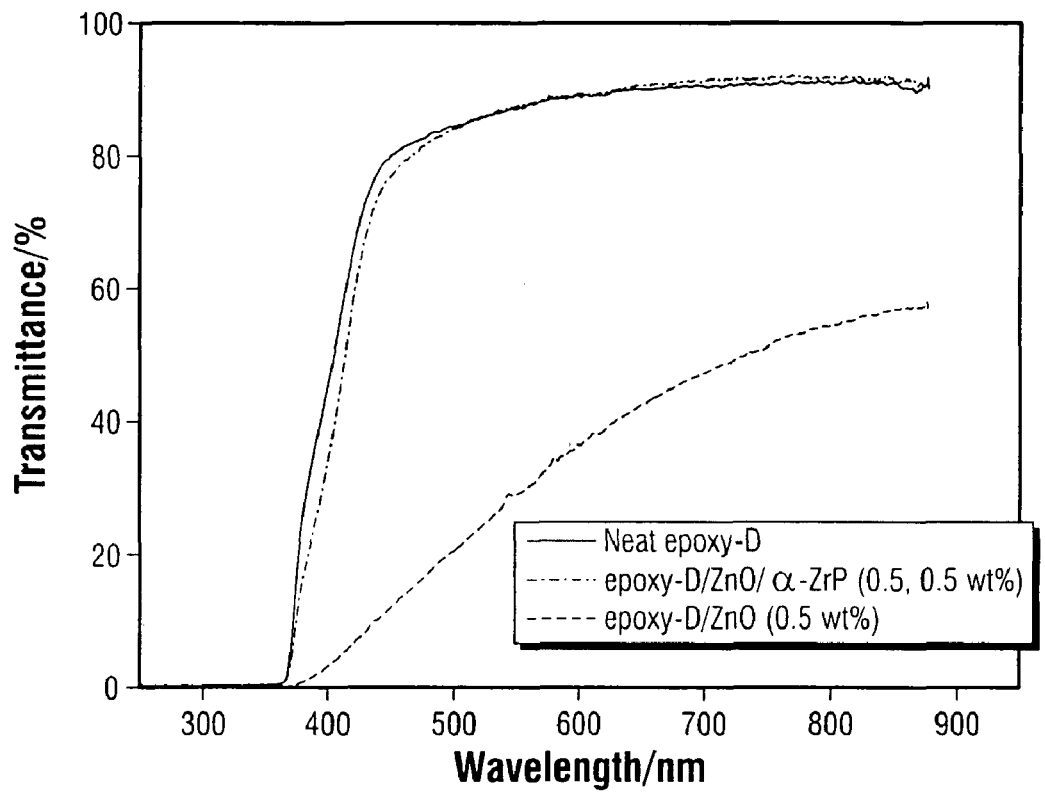
FIG. 3 is a ultraviolet and visible (UV-vis) spectra of a transmittance versus wavelength of one embodiment of a nanocomposite having nanoplatelets and one embodiment of a nanocomposite without nanoplatelets.

FIG. 3 shows the ultraviolet-visible light (UV-vis) spectra of the neat epoxy-D, the epoxy-D/ZnO/α-ZrP nanocomposite that contains 0.5 wt. % of ZnO and 0.5 wt. % of α-ZrP, and the epoxy-D/ZnO nanocomposite (0.5 wt. %) at the wavelength from 250 to around 900 nm. Transmittance of the neat epoxy-D at the wavelength of above 370 nm increases as increasing the wavelength and saturates at around 91% when the wavelength is longer than 600 nm. The epoxy-D/ZnO/Q-ZrP nanocomposites have a similar spectrum to the neat epoxy-D except that at the wavelength from 370 to 600 nm, the polymer nanocomposite shows a little bit lower transmittance than the neat epoxy. While having the wavelength above 600 nm, the transmittance of the polymer nanocomposites is slightly higher than that of the neat epoxy. In contrast, the epoxy-D/ZnO nanocomposite shows a much lower transmittance than either the neat epoxy or the polymer nanocomposite.

The light transmittance of a pure epoxy matrix, $T_m$, for a monochromatic light is given by the following equation.

$$T_m = (1-R)^2 \exp(-\alpha d) \quad (1)$$

Where R is the surface reflection and is given by $$R = \frac{(n-1)^2}{(n+1)^2} \quad (2)$$

Where α is the loss factor, d is the thickness of the specimen, n is the refractive index of the pure epoxy matrix. The refractive index of a typical DGEBA/amine system varies from 1.54 to 1.58, mainly because of their differences in density. If α=0, the estimated maximum light transmittance of the neat epoxy is around 91%, which is very close to the experimental finding. Therefore, α can be assumed to be around 0 at λ>600 nm for the neat epoxy-D. The above finding indicates that the light absorption in the neat epoxy with the thickness of around 2 mm is negligible at the wavelength of higher than 600 nm. In addition, the thicknesses of all the composite samples have been cut and polished to around 2 mm to make meaningful comparison.

The UV-vis spectrum of epoxy-D/ZnO/α-ZrP nanocomposite is very similar to that of the neat epoxy-D. This is due to the effective dispersion of the nanoparticles and nanoplatelets, especially the ZnO nanoparticles because the ZnO nanoparticles normally tend to form large aggregates as shown in epoxy-D/ZnO nanocomposite (FIG. 3). The transmittance of epoxy-D/ZnO nanocomposite is much lower than that of the neat epoxy-D and the epoxy-D/ZnO/α-ZrP nanocomposite since large ZnO aggregates have a micro-scaled size that is comparable with the wavelength of light to significantly cause light scattering to take place. As the sizes of the dispersed nanoparticles and nanoplatelets are reduced to the nanometer-scale, such as epoxy-D/ZnO/α-ZrP nanocomposites where the average size of the ZnO aggregate is less than about 15 nm, and an effective overall dispersion of nanoparticles is reached, light scattering due to the aggregation of ZnO nanoparticles becomes negligible. It should be noted that the exfoliated α-ZrP nanoplatelets in the epoxy matrices have an average diameter of 100 nm. The slightly lower transmittance of the epoxy-D/ZnO/α-ZrP nanocomposites than that of the neat epoxy-D at the wavelength from 370 to 600 nm is believed to be due to the light scattering from the well exfoliated α-ZrP nanoplatelets in the epoxy matrix. As for the wavelength below 370 nm, all the samples show a similar UV absorption due to the UV absorption from the epoxy matrix cured from DDS is overlapped with that from ZnO nanoparticles.

Figure 4:
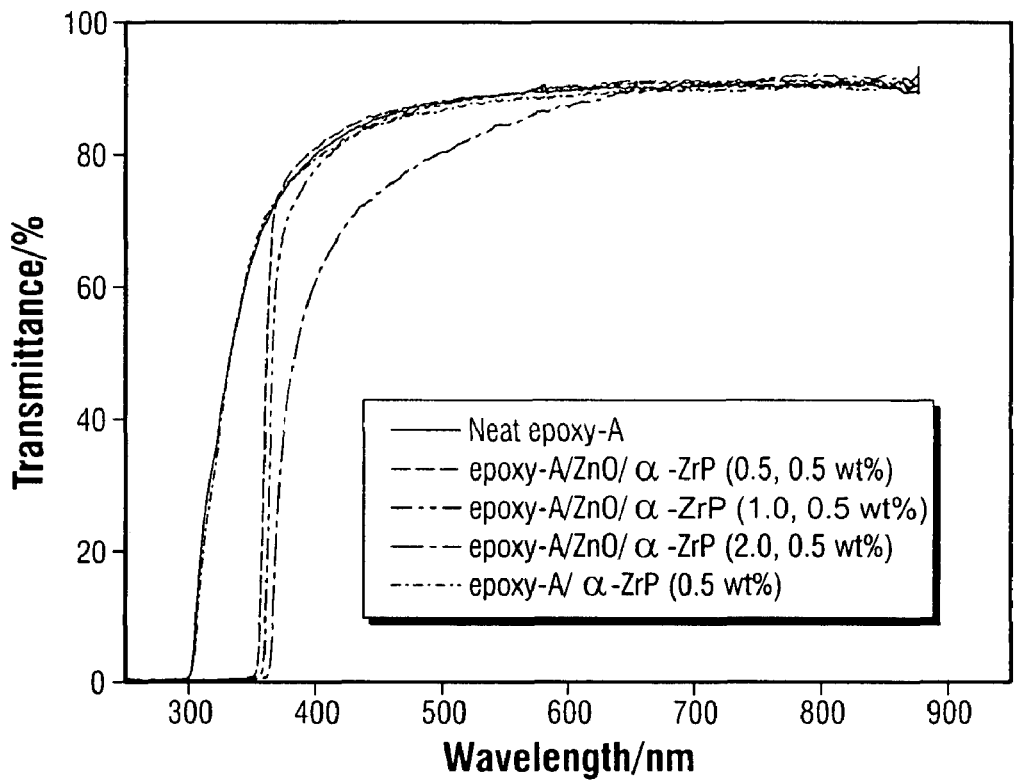
FIG. 4 is a UV-vis spectra of transmittance versus wavelength of epoxy, an epoxy-ZnO nanoparticle nanocomposite, an epoxy-nanoplatelet nanocomposite, and an epoxy-ZnO nanoparticle-nanoplatelet nanocomposite containing nanoplatelets with different amounts of nanoparticles.

FIG. 4 shows the UV-vis spectra of the neat epoxy-A, epoxy-A/ZnO nanocomposites (1.0 wt. % ZnO), epoxy-A/α-ZrP nanocomposites (0.5 wt. % α-ZrP), and epoxy-A/ZnO/α-ZrP nanocomposites containing 0.5 wt. % of α-ZrP nanoplatelets and 0.5, 1.0, and 2.0 wt. % of ZnO nanoparticles, respectively, at the wavelength from 250 to around 900 nm. Transmittance of the neat epoxy-A at the wavelength of above 300 nm increases as increasing the wavelength and saturates at around 91% when the wavelength is longer than 600 nm. Transmittance of the epoxy-A/α-ZrP nanocomposite is very similar to that of the neat epoxy-A, indicating an effective dispersion of exfoliated α-ZrP nanoplatelets with no additional UV absorption after introducing α-ZrP nanoplatelets into the epoxy matrix. Additionally, all the polymer nanocomposites show extra UV absorption compared with the neat epoxy-A and the epoxy-A/α-ZrP nanocomposites, but are still highly transparent after the addition of ZnO nanoparticles.

The UV-vis spectra of the epoxy-A/ZnO/α-ZrP nanocomposites show three transitions with the increase of the ZnO concentration from 0.5 to 1.0, and then to 2.0 wt. %. The first transition at the UV absorption onset, λ, shows red-shifting as the ZnO concentration increases. Usually, the UV absorption of the ZnO nanoparticles will shift towards the higher wavelength as the particle size increases, known as quantum size effects. However, all the ZnO nanoparticles used in this study have been prepared from the same procedure and the average particle size is around 5 nm. Therefore, the shifting is not believed to be due to the variation of the particle size, and is believed instead that the reduction of the inter-particle distances and the increase of the degree of aggregation are likely to account for the red-shifting of the UV absorption onset as the ZnO concentration increases. The second transition at the wavelength from λ to around 650 nm, a gradual decrease of the transmittance with the increase of the ZnO concentration is observed. This is believed to be understood that as the concentration increases, the ZnO nanoparticles get closer to each other and more aggregates are formed, thus more light with the relatively shorter wavelengths is scattered. The third transition when the wavelength is longer than 650 nm, the polymer nanocomposites containing the higher concentration of ZnO nanoparticles tend to have a higher transmittance. This unique property would be useful in optical applications.

The epoxy and nanocomposite samples cured by DDS are chosen to study the dispersion mechanisms of the ZnO nanoparticles and α-ZrP nanoplatelets in epoxy. TEM micrographs of the nanocomposites with various concentrations of the two nanoparticles and nanoplatelets were analyzed when the concentration of ZnO nanoparticles is fixed at 0.5 wt. %. The TEM analyzes revealed that the samples become more and more transparent with an increase in the concentration of α-ZrP nanoplatelets (0, 0.1, 0.3, and 0.5 wt. %). A gradual decrease of the degree of the aggregation of ZnO nanoparticles with the increase of the concentration of α-ZrP nanoplatelets could also be observed from the TEM observation, which accounts for the increase in transparency. When the concentration of α-ZrP nanoplatelets is fixed to 0.5 wt. %, and the concentrations of ZnO nanoparticles are 0.5 and 0.25 wt. %, both samples were observed to be as transparent as the neat epoxy, and the 0.25 wt. % of ZnO nanoparticles nanocomposite was observed to have improved dispersion (individually dispersed in the epoxy matrix) when compared to the 0.5 wt. % of ZnO nanoparticles nanocomposites (small aggregates of ZnO nanoparticles with the average size of less than 20 nm).

Figure 5:
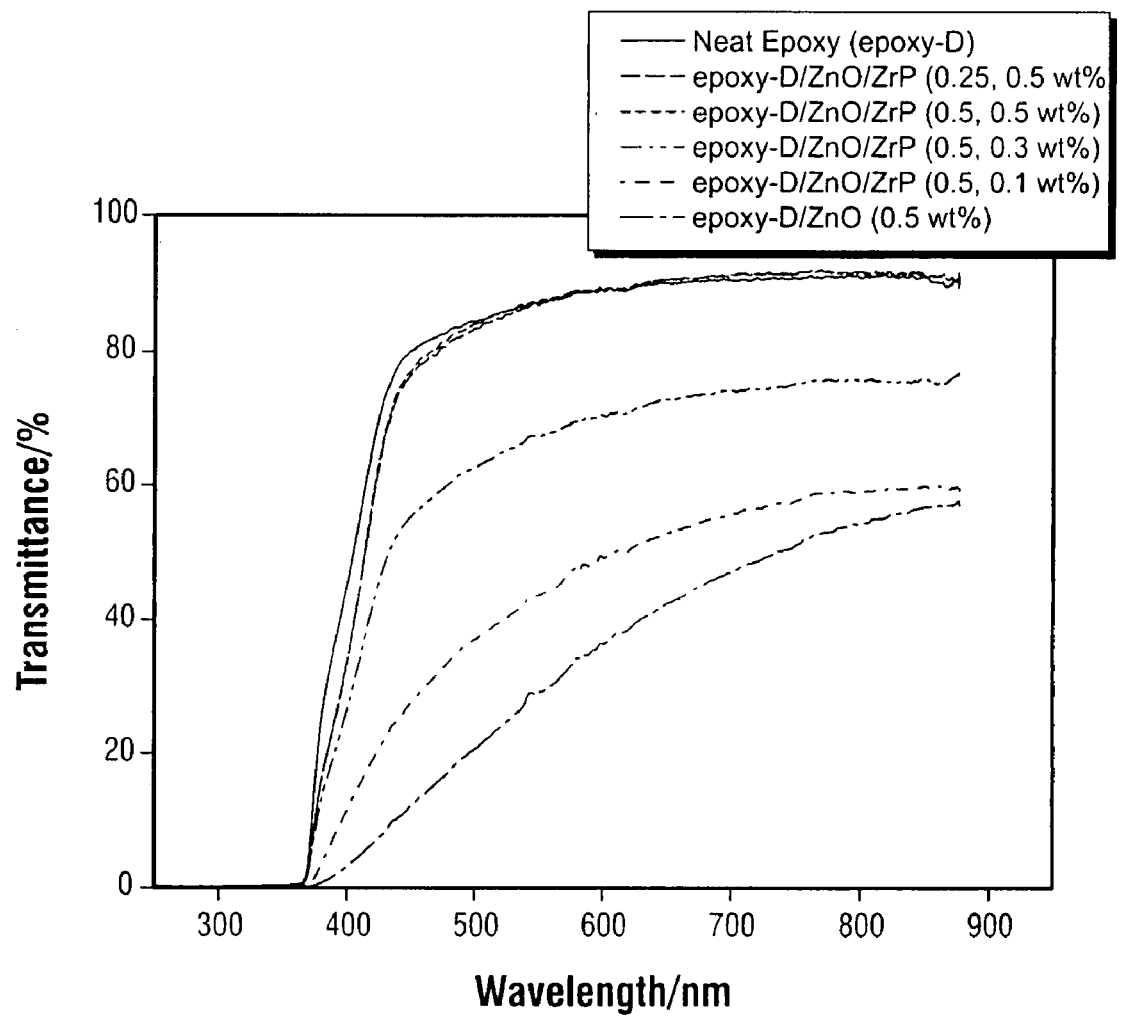
FIG. 5 is a UV-vis spectra of neat diaminodiphenylsulfone (DDS) cured epoxy and nanocomposites of transmittance versus wavelength.

FIG. 5 illustrates the UV-vis spectra of the nanocomposites with different concentrations of nanoparticles and nanoplatelets, as well as the neat epoxy-D. The increase of the transmittance with the increase of the concentration of α-ZrP nanoplatelets can be seen. It is observed that the existence of α-ZrP nanoplatelets improves the dispersion of ZnO nanoparticles in the epoxy matrix since the transmittance increases, which correlates to effective dispersion, with increased transmittance. It is further believed that the state of dispersion can be controlled by addition of α-ZrP nanoplatelets and that a high concentration of ZnO nanoparticles, such as up to 50% nanoparticles by weight, with the good dispersion in the polymer can be achieved by incorporating high concentration of α-ZrP nanoplatelets.

The Young's modulus of the nanocomposites produced with the materials described herein as well as unmodified control materials are listed in Table 1 below.

TABLE 1

| Material | Young's Modulus(GPa) |
| --- | --- |
| Neat epoxy-D | 2.99 ± 0.08 |
| Epoxy-D/ZnO | 2.91 ± 0.16 |
| epoxy-D/ZnO/TBA | 2.90 ± 0.15 |
| Epoxy-D/ZnO/α-ZrP | 3.40 ± 0.10 |
| Epoxy-D/α-ZrP | 3.38 ± 0.16 |

The Young's modulus of the epoxy-D/ZnO nanocomposites is similar to that of the epoxy-D/ZnO/TBA nanocomposites, and is slightly lower than that of the neat epoxy-D, while the epoxy-D/α-ZrP nanocomposites have a higher Young's modulus than the neat epoxy-D. The epoxy-D/ZnO/α-ZrP nanocomposites have a similar Young's modulus to the epoxy-D/α-ZrP nanocomposites, indicating that the effect of nanoscale dispersed ZnO nanoparticles on the Young's modulus of the epoxy matrix is negligible. Polyacrylonitrile (PAN)/ZnO and polystyrene(PS)/ZnO nanocomposites have higher Young's moduli than the polymer matrices when the ZnO concentration is 5 wt. %, and do not show obvious increase of Young's moduli when the ZnO concentration decreases to 1 wt. %. The increase in Young's modulus for the PAN/ZnO nanocomposite is much higher than that of the PS/ZnO nanocomposite. It is observed that the Young's modulus of the polymer/ZnO nanocomposites is strongly related to the nature of the polymer matrices. In the case of the epoxy/ZnO nanocomposites, a decrease of Young's modulus shown in this study could be that the large ZnO aggregates affecting the curing of the epoxy matrix, resulting in an incomplete cure of epoxy matrix.

The respective Young's moduli of both the epoxy-D/α-ZrP and epoxy-D/ZnO/α-ZrP nanocomposites are almost same, indicating that the effects of nanoscale-dispersed ZnO nanoparticles on the mechanical properties of the epoxy matrix are negligible. Therefore, it is believed that the polymer nanocomposites can maintain the transparency without compromising the mechanical of the epoxy matrix.

It has been observed and is believed that nano-scaled dispersion of semiconductor nanocrystals into polymer matrices has been easily achieved with inorganic nanoplatelets. The polymer nanocomposites formed thereof have a higher transmittance than the neat polymer in the higher wavelengths region because of the presence of ZnO nanoparticles also indicate that the polymer nanocomposites have UV-blocking characteristics. The onset of UV absorption shows red-shifting as the ZnO concentration is increased. Further, the higher the concentration of α-ZrP nanoplatelets, the improved the dispersion of ZnO nanoparticles in the epoxy matrix. Further, polymer nanocomposites can at least maintain the mechanical properties of the epoxy matrix without losing the transparency.

While the foregoing is directed to various embodiments of the invention, other and further embodiments of the invention may be devised without departing from the basic scope thereof and the scope thereof is determined by the claims that follow.

What is claimed is:

1. A polymer nanocomposite comprising:
    inorganic nanoparticles, wherein the inorganic nanoparticles are selected from the group consisting of zinc oxide, titanium oxide, gold, silver and combinations thereof, wherein the inorganic nanoparticles comprise between about 0.1 wt. % and about 4 wt. % of the polymer nanocomposite;
    inorganic nanoplatelets, wherein the inorganic nanoplatelets are selected from the group consisting of alpha-zirconium phosphate, titanium phosphate, halfnium phosphate, and combinations thereof, wherein more than 50% of the inorganic nanoplatelets are exfoliated, wherein the inorganic nanoplatelets comprise from about 0.05 wt. % to about 20 wt. % of the polymer nanocomposite; and
    a polymer material for optoelectronic applications selected from the group consisting of a thermoplastic resin having a number average molecular weight greater than about 5,000 and a thermosetting resin having a molecular weight between about 100 and about 5000.

2. The polymer nanocomposite of claim 1, wherein the inorganic nanoparticles are shaped as any one of the group consisting of sphere, ovoid, cube, pyramid and combinations thereof.

3. The polymer nanocomposite of claim 1, wherein the inorganic nanoparticles have an average particle size between about 1 nanometer and about 20 nanometers.

4. The polymer nanocomposite of claim 1, wherein the inorganic nanoplatelets comprise between about 0.05 wt. % and about 5 wt. % of the polymer nanocomposite.

5. The polymer nanocomposite of claim 1, wherein the inorganic nanoplatelets have a thickness between about 0.5 nanometer and about 1.5 nanometer.

6. The polymer nanocomposite of claim 1, wherein the polymer material comprises one or more polymer materials selected from the group consisting of a (meth)acrylic resin, styrenic resin, polycarbonate resin, polyester resin, epoxy resin, epoxidized phenolic resin, phenolic resin, phenylenevinylene resin, fluorene resin, fluorenevinylene resin, phenylene resin, thiophene resin, and combinations thereof.

7. The polymer nanocomposite of claim 6, wherein the polymer comprises one or more polymer material selected from the group consisting of a polymethylmethacrylate, polybutylacrylate, methlymethacrylate-butylacrylate copolymer, metylmethacrylate-styrene copolymer, polystyrene, styrene-acrylonitrile copolymer, styrene-isobutyrene copolymer, styrene-butylacrylate copolymer, polyethylene terephalate, polybutylene terephthalate, bisphenol-A epoxy resin, bisphenol-F epoxy resin, poly(2-methoxy-5-ethylhexyloxy-1,4-phenylenevinylene), poly(9,9-di-(2-ethylhexyl)-fluorenyl 2,7-diyl), poly(9,9-dioctylfluorenyl-2,7-diyl), poly(9,9-dihexyifluorenyl-2,7-divinylene-fluorenylene), poly(9,9-dihexyl-2,7-(2-cyanodivinylene)-fluorenylene), poly(2,5-dioctyl-1,4-phenylene), poly[2-(6-cyano-6-methlyheptyloxy) -1,4-phenylene], poly(3-hexylthiophene), and combinations thereof.

8. The polymer nanocomposite of claim 1, wherein the inorganic nanoparticles have an average particle size between about 1 nanometer and about 10 nanometers.

9. A polymer nanocomposite comprising:
    inorganic nanoparticles, wherein the inorganic nanoparticles are zinc oxide;
    inorganic nanoplatelets, wherein more than 50% of the inorganic nanoplatelets are exfoliated, wherein the inorganic nanoplatelets are alpha-zirconium phosphate; and
    a polymer material wherein the polymer material is an epoxy material having a molecular weight between about 100 and about 5000.

10. The polymer nanocomposite of claim 9, wherein the inorganic nanoparticles have an average particle size between about 1 nanometer and about 10 nanometers.

11. The polymer nanocomposite of claim 9, wherein the inorganic nanoparticles comprise between about 0.1 wt. % and about 4 wt. % of the polymer nanocomposite.

12. The polymer nanocomposite of claim 9, wherein the inorganic nanoplatelets comprise from about 0.05 wt. % to about 20 wt. % of the polymer nanocomposite.

13. The polymer nanocomposite of claim 9, wherein the inorganic nanoparticles have an average particle size between about 0.1 nanometer and about 100 nanometers.

14. The polymer nanocomposite of claim 9, wherein the inorganic nanoplatelets have a thickness between about 0.1 nanometer and about 5 nanometer.

15. The polymer nanocomposite of claim 9, wherein the inorganic nanoplatelets are in an amount between about 0.1 wt. % and about 0.5 wt. %.

16. The polymer nanocomposite of claim 9, wherein the inorganic nanoparticles are in an amount between about 0.25 wt. % and about 2 wt. %.

* * * * *

UNITED STATES PATENT AND TRADEMARK OFFICE
CERTIFICATE OF CORRECTION

PATENT NO. : 8,344,054 B2  
APPLICATION NO. : 11/880820  
DATED : January 1, 2013  
INVENTOR(S) : Nobuo Miyatake et al.

Page 1 of 1

It is certified that error appears in the above-identified patent and that said Letters Patent is hereby corrected as shown below:

On the Title Page:

Item (73), add a second Assignee, as follows:

-- Kaneka Corporation,
Osaka (JP) --

Signed and Sealed this  
Fifth Day of November, 2013

Teresa Stanek Rea  
*Deputy Director of the United States Patent and Trademark Office*